Aug. 22, 1950   R. C. ARNOLD   2,519,338
FISH LURE
Filed May 3, 1946

INVENTOR.
Robert C. Arnold
BY Victor J. Evans & Co.
ATTORNEYS

Patented Aug. 22, 1950

2,519,338

UNITED STATES PATENT OFFICE 2,519,338

FISH LURE

Robert C. Arnold, Lima, Ohio, assignor of one-half to Herbert H. Brown, Lima, Ohio Application May 3, 1946, Serial No. 667,026

1 Claim. (Cl. 43—42.28)

The invention relates to a fishing spoon, and more especially to a fish lure.

The primary object of the invention is the provision of a lure of this character, wherein it is provided with a spiral tail streamer, which imparts a half rolling action or side to side rocking movement to the lure when drawn through water, and this streamer is made from elastic material so that it will extend and contract, thus giving a jerking or darting activity to the said lure.

Another object of the invention is the provision of a lure of this character, wherein it is usable in fishing or angling in fresh or salt water, also in casting or trolling with a rod, reel and line, it being novel in construction and unique in behavior, as well as weed-proof and avoids snag fouling.

A still further object of the invention is the provision of a lure of this character, which is simple in construction, thoroughly reliable and efficient in operation, strong, durable, light in weight, and inexpensive to manufacture.

With these and other objects in view, the invention consists in the features of construction, combination and arrangement of parts as will be hereinafter more fully described, illustrated in the accompanying drawing, which discloses the preferred embodiment of the invention, and pointed out in the claim hereunto appended.

In the accompanying drawing.

Similar reference characters indicate corresponding parts throughout the several views in the drawing.

Figure 1:
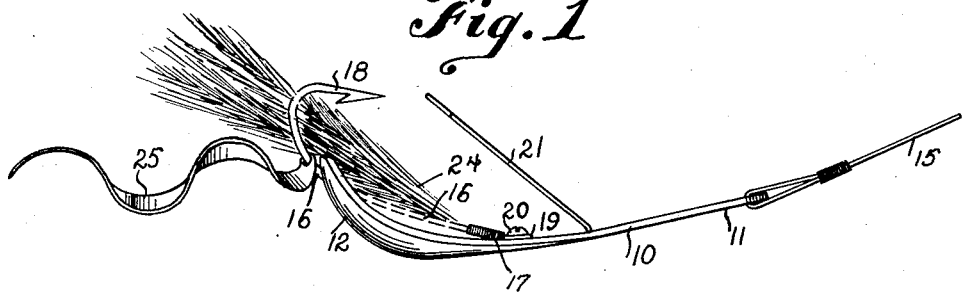
Figure 1 is a side view of the lure constructed in accordance with the invention.
Figure 2:
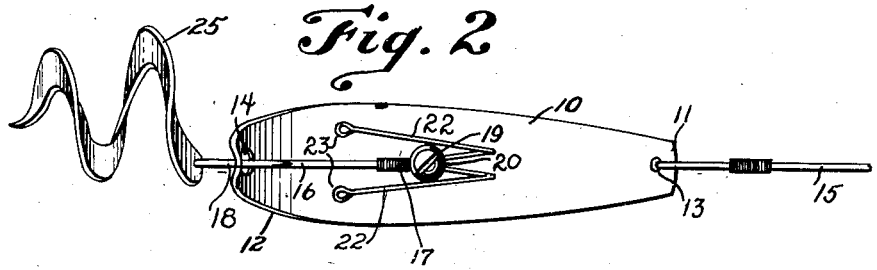
Figure 2 is a top plan view.

Referring to the drawing in detail, the lure constituting the present invention, comprises an elongated fishing spoon body 10, which has the fore and aft ends 11 and 12, respectively, the latter having a greater curvature than the fore end, which is due to the downward arching of the body in a longitudinal direction. The ends 11 and 12 are formed with openings 13 and 14, respectively, the opening 13 being for the fastening of a line thereto, a portion of the same being indicated at 15, while the opening 14 has trained therethrough the shank 16 of a fish hook 17. The sharp end 18 of the hook extends above the aft end of the body, while the opposite end of this hook at the eye 19 thereof is secured to the body 10 by a fastener 20 engaged therein at the longitudinal center of such body.

The fastener 20 affixes a double prong weed guard 21 in place on the body 10, its arms or prongs 22 being forwardly inclined and upwardly diverge from each other to lie in advance of the bill end 18 and to opposite sides thereof, the arms or tines being inherently resilient and provided with loop terminals 23. These arms 22 spring back to normal position when struck by a fish or on striking under water obstruction. The loop terminals 23 prevent injury to a person in attaching lure to the line by contacting the bill end of the hook.

These arms 22 render the lure weed-proof, and eliminate hook fouling. Attached to the body 10 and also by the fastener 20 are feathers 24, which lie about the bill end 18 of the hook and also effect a guide to the lure, as well as aid in arighting hook up on the water.

Connected to the hook shank 16 between the aft end of the body 10 and the bill of such hook is a spiral streamer or tail strip 25 which serves to impart a half rolling action or side-to-side rocking movement to the lure when being retrieved through the water, without the whirling or turning over of the same and eliminates the twisting of the line 15, and additionally avoids the use of a swivel or other coupling connection to the said line.

The spiral streamer comprises a rubber strip, in the shape of a spiral, provided with coils, each having wall surfaces in a plane intersecting the longitudinal axis of the strip, whereby the streamer is sufficiently elastic to expand and contract when the lure is drawn through the water due to the action or the water as it strikes said surfaces.

What is claimed is:

A fish lure comprising a rubber strip, in the shape of a spiral, provided with coils, each having wall surfaces in a plane intersecting the longitudinal axis of the strip, said strip being sufficiently elastic to expand and contract when the lure is drawn through the water due to the action of the water as it strikes said surfaces.

ROBERT C. ARNOLD.

REFERENCES CITED

The following references are of record in the file of this patent:

UNITED STATES PATENTS

| Number | Name | Date |
| --- | --- | --- |
| 1,272,183 | Arnold | July 9, 1918 |
| 1,530,343 | Bayer | Mar. 17, 1925 |
| 1,813,416 | Miles | July 7, 1931 |
| 1,831,870 | McIntosh | Nov. 17, 1931 |
| 1,910,742 | Binns | May 23, 1933 |
| 1,986,738 | Mitchell | Jan. 1, 1935 |

FOREIGN PATENTS

| Number | Country | Date |
| --- | --- | --- |
| 2,102 | Great Britain | of 1890 |
| 19,111 | Great Britain | of 1901 |